(12) United States Patent
Lagree et al.

(10) Patent No.: US 11,328,888 B2
(45) Date of Patent: May 10, 2022

(54) BUS PLUG INCLUDING REMOTELY OPERATED CIRCUIT BREAKER AND ELECTRICAL SYSTEM INCLUDING THE SAME

(71) Applicant: EATON INTELLIGENT POWER LIMITED, Dublin (IE)

(72) Inventors: James L. Lagree, Robinson Township, PA (US); Rufus L. Barnes, St. Louis, MO (US); Kristen Dipner, Glenshaw, PA (US); Meghan Saitwal, Aurangabad (IN); Saurabh Pawar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 117 days.

(21) Appl. No.: 16/779,867

(22) Filed: Feb. 3, 2020

(65) Prior Publication Data

US 2020/0251297 A1 Aug. 6, 2020

Related U.S. Application Data

(63) Continuation of application No. 15/843,561, filed on Dec. 15, 2017, now Pat. No. 10,553,382.

(51) Int. Cl.
*H01H 71/12* (2006.01)
*H02G 5/08* (2006.01)
*H01H 9/54* (2006.01)

(52) U.S. Cl.
CPC ............. *H01H 71/12* (2013.01); *H01H 9/54* (2013.01); *H02G 5/08* (2013.01)

(58) Field of Classification Search
CPC ............. H01H 71/12; H01H 9/54; H03G 5/08

USPC .......................................................... 307/143
See application file for complete search history.

(56) References Cited

U.S. PATENT DOCUMENTS

| 7,819,676 B1 * | 10/2010 | Cardoso | H01R 13/245 439/115 |
| 2007/0183111 A1 | 8/2007 | Carlino et al. | |
| 2010/0204933 A1 | 8/2010 | Lagree | |
| 2012/0024677 A1 * | 2/2012 | Safreed, III | H01H 9/20 200/50.24 |
| 2015/0070820 A1 * | 3/2015 | Jur | H02G 5/08 361/679.01 |
| 2016/0231721 A1 | 8/2016 | Lakshmanan et al. | |
| 2017/0317504 A1 * | 11/2017 | Hall | H01R 25/142 |

* cited by examiner

*Primary Examiner* — Hal Kaplan
(74) *Attorney, Agent, or Firm* — Eckert Seamans Cherin & Mellott, LLC

(57) ABSTRACT

A bus plug structured to electrically connect between a busway and a load includes a circuit breaker structured to electrically connect between connectors and the load and to output a first control signal, the circuit breaker including separable contacts structured to open to stop power from the flowing from the busway to the load, a motor operator structured to cause the separable contacts to open or close in response to the first control signal from the circuit breaker, and a wireless communication module structured to wirelessly communicate with an external device and to output a second control signal to the circuit breaker is response to wireless communication received from the external device. The circuit breaker is structured to output the first control signal to the motor operator to open or close the separable contacts in response to receiving the second control signal from the wireless communication module.

17 Claims, 5 Drawing Sheets

BUS PLUG INCLUDING REMOTELY OPERATED CIRCUIT BREAKER AND ELECTRICAL SYSTEM INCLUDING THE SAME

CROSS-REFERENCE TO RELATED APPLICATION

This application is a continuation of, and claims priority to, U.S. patent application Ser. No. 15/843,561, filed Dec. 15, 2017, entitled "BUS PLUG INCLUDING REMOTELY OPERATED CIRCUIT BREAKER AND ELECTRICAL SYSTEM INCLUDING THE SAME", the contents of which are incorporated herein by reference.

BACKGROUND

Field

The disclosed concept relates generally to bus plugs, and in particular, to bus plugs including a circuit breaker. The disclosed concept also relates to electrical systems.

Background Information

Many buildings use busways to carry electricity. Busways typically consist of a number of busbars housed in an enclosure. The busbars conduct electricity along the busway. Busways will span across an area where electricity is needed. To tap into the electricity so that it can be provided to a load, a bus plug is used to attach to and plug into the busway to make contact with the conductors.

FIG. 1 shows an example application of a busway 10 and bus plug 20. The bus plug 20 is used to tap into the electricity carried by the busway 10 to provide power to a load 30. As is typical in industrial applications, the busway 10 is located above the load 30. For example, the busway 10 may be run along the ceiling. The bus plug 20 is attached to the busway 10 above the load 30. A conduit or cable 40 is used to carry electricity from the busway 10 to the load. The arrangement shown in FIG. 1 is typical in industrial applications as it provides convenient access to power for loads located in central locations of large rooms such as warehouses or factories. As loads are removed or move from location to location the bus plug 20 can be easily moved to another tap in the busway 10.

The bus plug 20 includes a circuit breaker (not shown). Opening the circuit breaker shuts off power to the load 30. The bus plug 20 includes a lever 50 that is operatively connected to the circuit breaker such that operation of the lever 50 can open or close the circuit breaker. When the circuit breaker is opened the lever 50 contains the ability to be locked out with standard practice locks to prevent unwanted closure of the circuit breaker causing a fault or electrocution of a person doing maintenance on the load. A mechanical dial 80 connected to the lever 50 indicates the state of the breaker being open or closed (i.e., that the bus plug 20 is on or off). It is generally safe practice to open the circuit breaker when servicing the load 30. To operate the lever 50, a technician 60 at ground level uses an insulated pole 70 to reach the lever 50. However, the bus plug 20 requires physical interaction in order to open the circuit breaker. The physical interaction is inconvenient and could present a safety hazard to the technician 70. The technician 70 must also look at the current position of the lever 50 to determine whether the circuit breaker is on or off.

There is room for improvement in bus plugs.

There is also room for improvement in electrical systems including bus plugs.

SUMMARY

These needs and others are met by embodiments of the disclosed concept in which a bus plug includes a wireless communication module and a circuit breaker that is capable of being opened and closed in response to wireless communication received via the wireless communication module.

In accordance with aspects of the disclosed concept, a bus plug structured to electrically connect between a busway and a load comprises: a number of connectors structured to electrically connect to the busway; a circuit breaker structured to electrically connect between the number of connects and the load and to output a first control signal, the circuit breaker including separable contacts structured to open to stop power from the flowing from the busway to the load; a motor operator structured to cause the separable contacts to open or close in response to the first control signal from the circuit breaker; and a wireless communication module structured to wirelessly communicate with an external device and to output a second control signal to the circuit breaker is response to wireless communication received from the external device, wherein the circuit breaker is structured to output the first control signal to the motor operator to open or close the separable contacts in response to receiving the second control signal from the wireless communication module.

In accordance with other aspects of the disclosed concept, an electrical system comprises: a busway; an external device; and a bus plug electrically coupled between the busway and a load, the bus plug comprising: a number of connectors electrically connected to the busway; a circuit breaker electrically connected between the number of connectors and the load and structured to output a first control signal, the circuit breaker including separable contacts structured to open to stop power from the flowing from the busway to the load; a motor operator structured to cause the separable contacts to open or close in response to the first control signal from the circuit breaker; and a wireless communication module structured to wirelessly communicate with the external device and to output a second control signal to the circuit breaker is response to wireless communication received from the external device, wherein the circuit breaker is structured to output the first control signal to the motor operator to open or close the separable contacts in response to receiving the second control signal from the wireless communication module.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
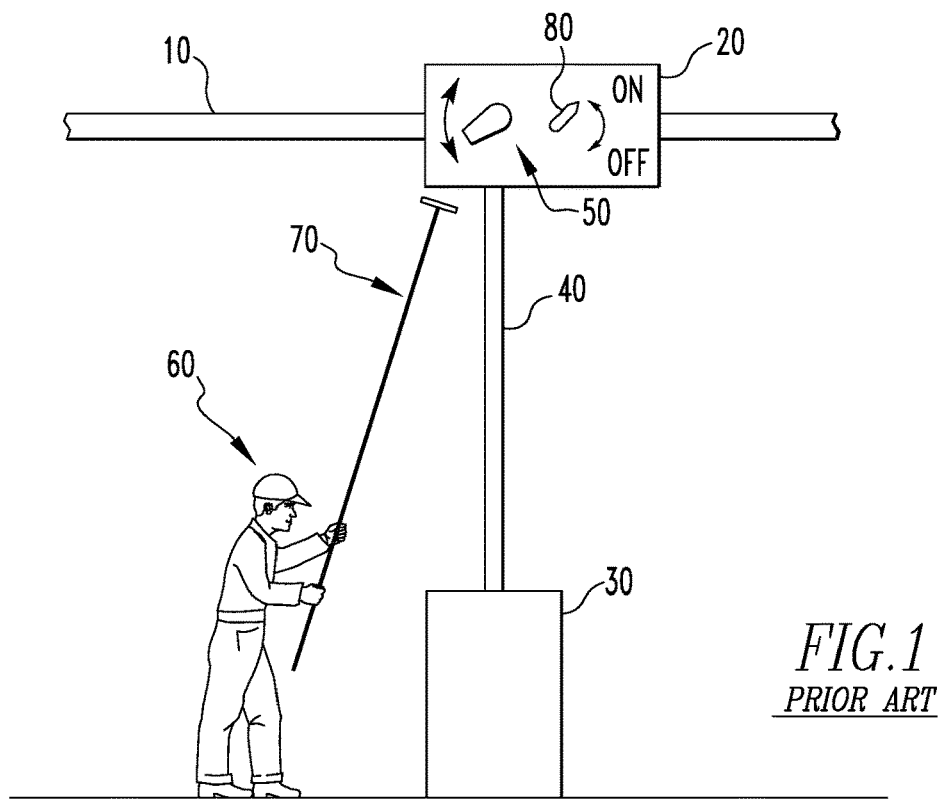
FIG. 1 is a schematic diagram of an example of an electrical system including a busway and a bus plug.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

Figure 2:
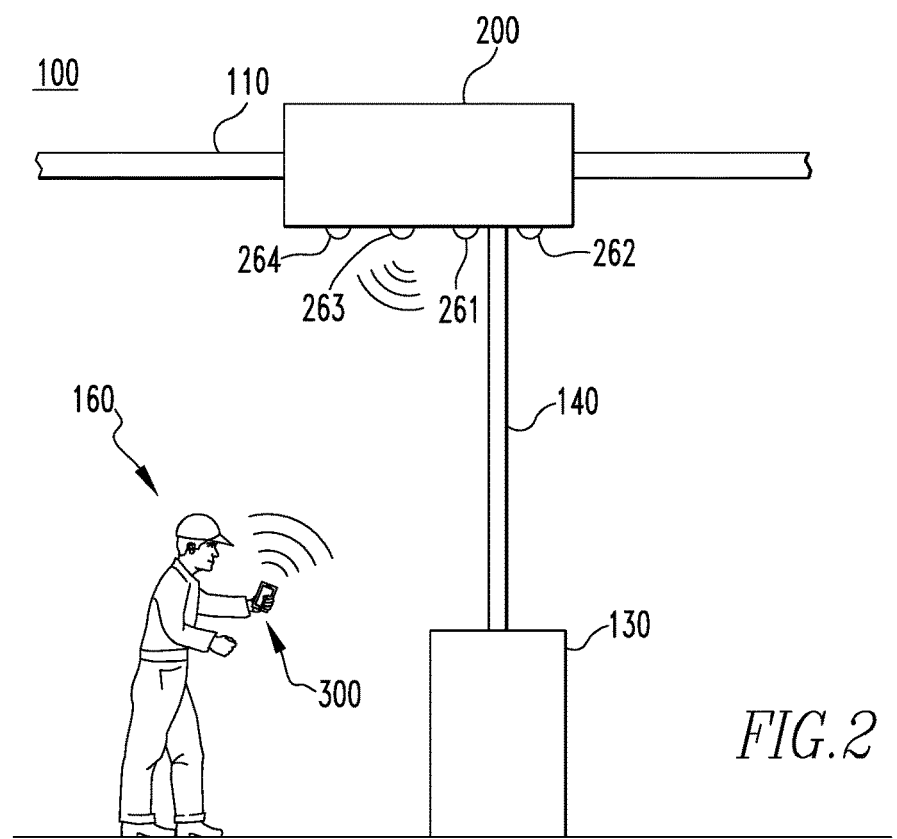
FIG. 2 is a schematic diagram of an electrical system in accordance with an example embodiment of the disclosed concept.

FIG. 2 is a schematic diagram of an electrical system 100 in accordance with an example embodiment of the disclosed concept. The electrical system 100 includes a busway 110. The busway 110 includes one or more internal conductors 112 (shown in FIG. 3) that carry electrical power from a power source. The electrical system 100 includes a bus plug 200 that plugs into the busway 110 such that it can tap into the electrical power carried by the busway 110. The bus plug 200 is structured to provide the electrical power to a load 130 via a conduit 140. In the example shown in FIG. 2, the bus plug 200 is located above the load 130. However, it will be appreciated by those having ordinary skill in the art that the bus plug 200 may be disposed in other locations with respect to the load 130 without departing from the scope of the disclosed concept.

Figure 3:
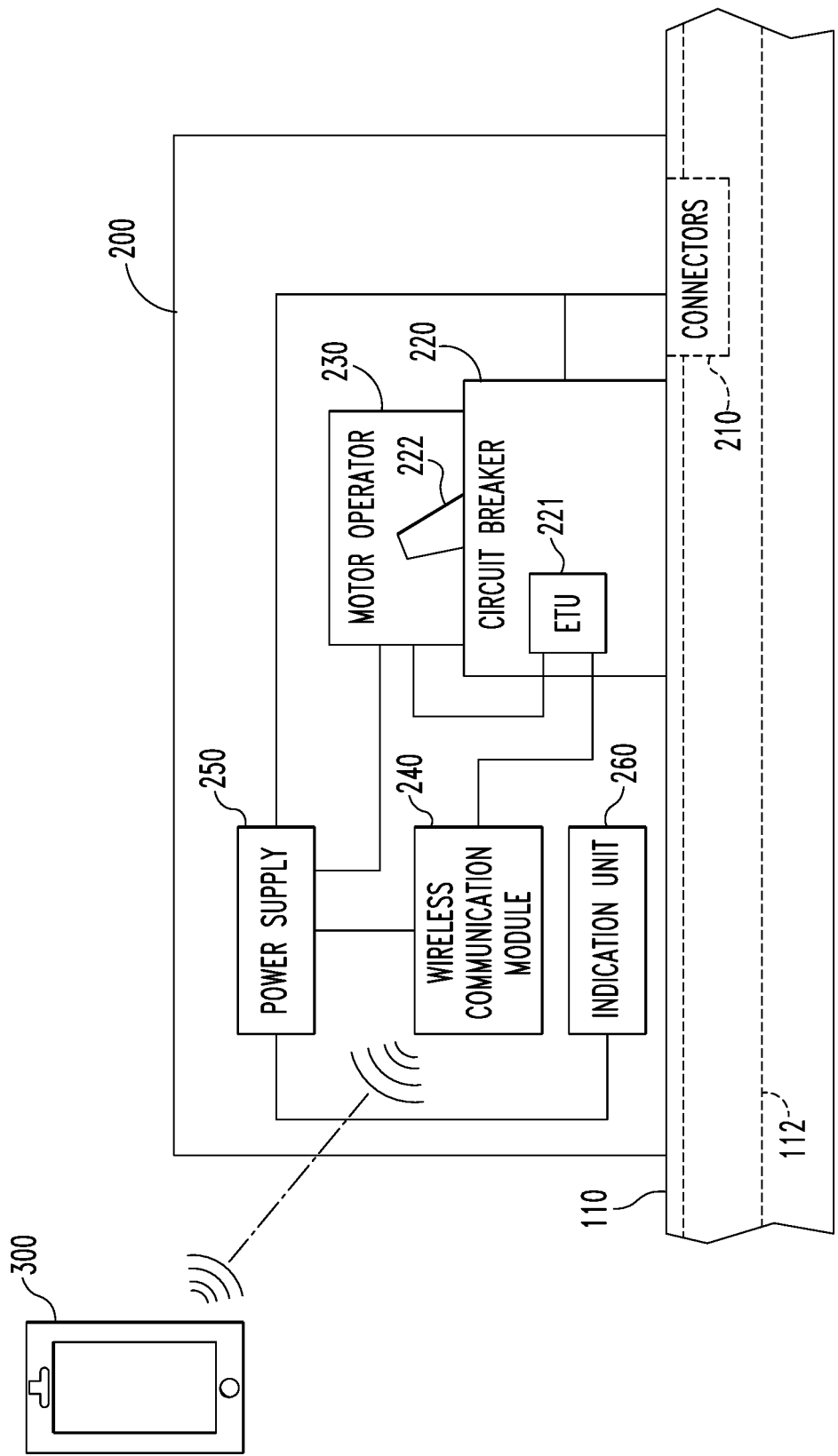
FIG. 3 is a schematic diagram of a bus plug in accordance with an example embodiment of the disclosed concept.

The bus plug 200 includes a circuit breaker 220 (shown in FIG. 3). The bus plug 200 has an on state in which the circuit breaker 220 is closed and allows power to flow from the busway 110 to the load 130 and an off state in which the circuit breaker 220 is open and prevents power from flowing from the busway 110 to the load 130. The bus plug 200 is structured to wirelessly communicate with an external device 300. The external device 300 may be, for example and without limitation, a computer, a tablet, a mobile phone, or any other device suitable for wireless communication. In some example embodiments, a user 160 may input a command or instruction to the external device 300. In response, the external device 300 wirelessly communicates the command or instruction to the bus plug 200. For example and without limitation, in some example embodiments the disclosed concept the command or instruction is to turn on or turn off the bus plug 200. In response to wirelessly receiving the command or instruction, the bus plug 200 turns off or turns on based on the instruction by causing the circuit breaker 220 to open or close. Through wireless communication between the external device 300 and the bus plug 200, the user 160 is able to remotely turn on or turn off the bus plug 200 without the need to physically interact with the bus plug 200. Thus, it is convenient and safe to turn on and turn off the bus plug 200. In some example embodiments of the disclosed concept, remotely turning off the bus plug 200 electronically locks out the circuit breaker 220 without the need to physically interact with the bus plug 200 to lock it out.

It will be appreciated by those having ordinary skill in the art that other information may be wirelessly communicated between the bus plug 200 and the external device 300. For example and without limitation, the bus plug 200 may meter power flowing though it to obtain metering information. The bus plug 200 may wirelessly communicate the metering information to the external device 300 and the user 160 may access the metering information at the external device 300. While metering information is one type of information that may be wirelessly communicated between the bus plug 200 and the external device 300, it will be appreciated that many different types of information may also be communicated between the bus plug 200 and the external device 300 without departing from the scope of the disclosed concept.

FIG. 3 is a schematic diagram of the bus plug 200 in more detail in accordance with an example embodiment of the disclosed concept. The bus plug 200 includes connectors 210, the circuit breaker 220, a motor operator 230, a wireless communication module 240, a power supply 250, and an indication unit 260. The connectors 210 are structured to extend into the busway 110 and contact one or more of the conductors 112 in the busway 110 to form an electrical connection. The connectors 210 may be, for example and without limitation, stabs. However, it will be appreciated by those having ordinary skill in the art that any type of connector suitable for forming an electrical connection with conductors 112 in the busway 110 may be employed without departing from the scope of the disclosed concept.

The circuit breaker 220 is structured to receive electrical power from the busway 110 via the connectors 210. The circuit breaker 220 includes an electronic trip unit 221. The electronic trip unit 221 is structured to communicate with the motor operator 230 and the wireless communication module 240. For example and without limitation, the electronic trip unit 221 may send control signals to the motor operator 230 via wired communication. The electronic trip unit 221 may also receive control signals from the wireless communication module 240 via wired communication. The electronic trip unit 221 may receive signals from the wireless communications module 240 via the wired communication to lock out the motor operator 230 and prevent any closing of the circuit breaker 220 by the motor operator 230. The electronic trip unit 221 may further communicate with the wireless communication module 240 via wired communication to send and/or receive information such as metering information.

The motor operator 230 is structured to cause the circuit breaker 220 to open or close. The motor operator 230 may cause the circuit breaker 220 to open or close in response to a control signal received from the electronic trip unit 221 of the circuit breaker 220. In some example embodiments of the disclosed concept, the circuit breaker 220 includes a lever 222. Actuation of the lever 222 causes the circuit breaker 220 to open or close. In some example embodiments of the disclosed concept, the motor operator 230 is structured to physically interact with the lever 222 in order to actuate the lever 222 and cause the circuit breaker to open or close.

The wireless communication module 240 is structured to wirelessly communicate with the external device 300. The wireless communication module 240 may use any suitable wireless communication protocol (e.g., without limitation, wi-fi, Bluetooth, or other wireless communication protocols) for wirelessly communicating with the external device 300. As used herein, the terminology that a device wirelessly communicates shall mean that the device receives or transmits the communication as a radio frequency communication or other wireless form of communication. It will be appreciated by those having ordinary skill in the art that the terminology that a device wirelessly communicates does not preclude the communication passing through various intermediary devices (e.g., without limitation, switches, routers, various network equipment, a communication network such as a cell phone network, etc.) that may include some intermediate wired communications may be employed. Thus, for example, if the wireless communication module transmits or receives a signal wirelessly in the process of communicating with the external device 300, the wireless communication module 240 is considered to wirelessly communicate with the external device 300 even if the communication passed through some intermediate wired device such as a network switch or router. So long as the wireless communication module 240 transmitted or received the communication in a wireless manner, it is considered to have communicated wireless for the purposes of the present disclosure.

The wireless communication module 240 is structured to receive commands or instructions from the external device 300 as a wireless communication. The wireless communication module 240 is also structured to communicate with the external trip unit 221 of the circuit breaker 220 via wired communication (e.g., without limitation, ethernet). The command or instruction may be a command or instruction to open or close the circuit breaker 220. In response to the wireless communication including a command or instruction to open or close the circuit breaker 220, the wireless communication module 240 is structured to output a control signal to the circuit breaker 220 via wired communication. In response to the control signal, the circuit breaker 220 is structured to output another control signal to the motor operator 230 via wired communication which causes the motor operator 230 to cause the circuit breaker 220 to open or close. It will be appreciated that the command or instruction as well as the control signals may indicate a selected one of opening or closing the circuit breaker 220 and that the motor operator 230 may cause the selected one of opening or closing of the circuit breaker 220 in response to receiving the control signal from the circuit breaker 220.

The wireless communication module 240 may also wirelessly communicate with the external device 300 to send or receive information. In some example embodiments of the disclosed concept, the wireless communication module 240 is structured to receive information, such as metering information, from the electronic trip unit 221 via wired communication. The wireless communication module 240 is structured to wirelessly communicate the information to the external device 300 where it may then be accessed by the user 160. The wireless communication module 240 may also receive information such as, without limitation, settings information, from the external device 300 via wireless communication. The wireless communication module 240 may then communicate the information to the electronic trip unit 221 or other components via wired communication. The electronic trip unit 221 may act on the information. For example and without limitation, the electronic trip unit 221 may adjust its setting based on the settings information.

In some example embodiments of the disclosed concept, the electronic trip unit 221 may have a maintenance mode. The maintenance mode may have associated maintenance mode settings which reduce arc energy during a trip compared to the arc energy during a trip when standard settings are used. The maintenance mode settings may include, for example and without limitation, reducing or eliminating a specified delay associated with a zone interlock system. The capability of the electronic trip unit 221 to enter the maintenance mode may be referred to as an arc flash reduction maintenance system (ARMS). The maintenance mode provides protection to worker performing maintenance on the bus plug 200 when the bus plug 200 is on. In some example embodiments of the disclosed concept, a command to enter the maintenance mode may be received by the external device 300. The command may be communicated wirelessly to the wireless communication module 240. The wireless communication module 240 may then communicate the command to the electronic trip unit 221 and the electronic trip unit 221 may enter the maintenance mode based on the command.

The power supply 250 is electrically connected to the connectors 210 such that it receives power from the busway 110 via the connectors 210. The power supply 250 is structured to convert power from the busway 110 for use by components of the bus plug 200. In some example embodiments, the busway 110 carries AC electrical power. The power supply 250 is structured to convert the AC electrical power to DC electrical power (e.g., without limitation, 24V power) for use by components of the bus plug 200 such as, without limitation, the circuit breaker 220, the motor operator 230, the wireless communication module 240, and the indication unit 260.

The indication unit 260 is structured to provide a visual indication of the status of the bus plug 200. For example and without limitation, the indication unit 260 may provide a visual indication of whether the circuit breaker 220 is open or closed. The indication unit 260 may also provide an indication of whether remote operation of the bus plug 200 is available. In some example embodiments of the disclosed concept, the indication unit 260 includes a number of visual indicators 261,262,263,264 (shown in FIG. 6). The visual indicators 261,262,263,264 may be disposed such that they are visible from an exterior of the bus plug 200. The visual indicators 261,262,263,264 may be controlled such that they provide a visual indication of the status of the bus plug 200. For example and without limitation, the visual indicators 261,262,263,264 may include a first visual indicator 261 that is activated to provide a first indication indicating that the bus plug 200 is in the on state (i.e., the circuit breaker is closed) and a second indicator 262 that is activated to provide a second indication indicating that the bus plug 200 is in the off state (i.e., the circuit breaker 220 is open). The visual indicators 261,262,263,264 may also include a third indicator 263 that is activated to provide a third indication indicating that remote operation of the bus plug 200 is available. The visual indicators 261,262,263,264 may also include a fourth indicator 264 that confirms to the maintenance personnel that the electronic trip unit 221 and circuit breaker 220 are in the maintenance mode and it is safe to work on the conduit or cable 140 or the load 130.

The indication unit 260 may be controlled in any suitable manner. For example and without limitation, the electronic trip unit 221, the wireless communication module 240, or a combination of the two may be employed to control the indication unit 260. It will also be appreciated that the indication unit 260 may include its own controller to operate itself in response to receiving communications from other components without departing from the scope of the disclosed concept. The visual indicators 261,262,263,264 may be lights that are lit up when activated. In some example embodiments of the disclosed concept, the visual indicators 261,262,263,264 may be light emitting diodes. However, it will be appreciated by those having ordinary skill in the art that other devices capable of activating to provide a visual indication may be employed without departing from the scope of the disclosed concept.

Figure 4:
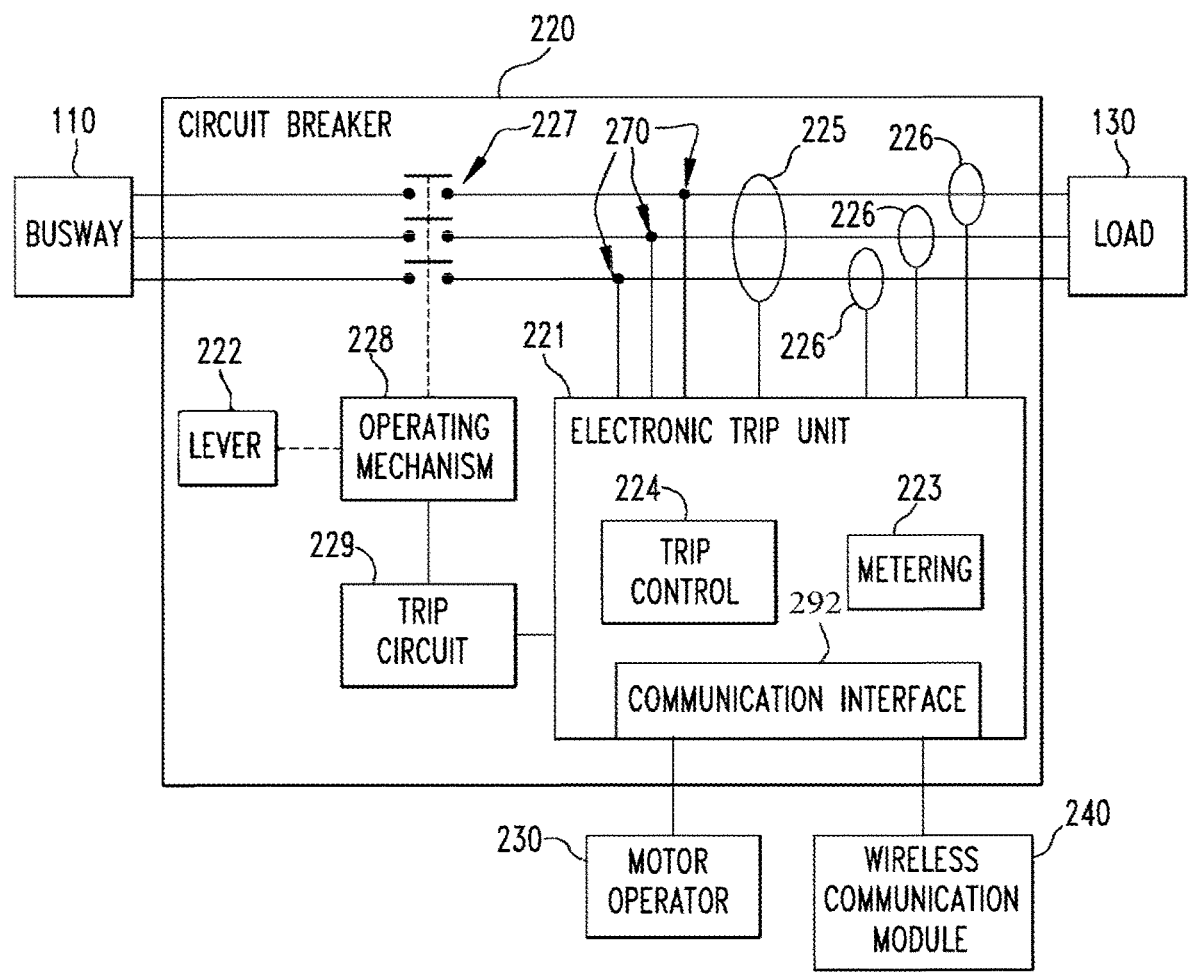
FIG. 4 is a schematic diagram of a circuit breaker in accordance with an example embodiment of the disclosed concept.

FIG. 4 is a schematic diagram of the circuit breaker 220 shown in more detail in accordance with an example embodiment of the disclosed concept. The circuit breaker 220 includes the electronic trip unit 221, the lever 222, one or more sensors 225,226, separable contacts 227, an operating mechanism 228, and a trip circuit 229. The circuit breaker 220 is electrically coupled between the busway 110 and the load 130. Opening the separable contacts 227 interrupts the electrical connection between the busway 110 and the load 130 and stops power from flowing from the busway 110 to the load. While a 3-phase circuit breaker 220 is shown in FIG. 4, it will be appreciated that a single phase circuit breaker or any other number of phases may be employed without departing from the scope of the disclosed concept.

The operating mechanism 228 is structured to physically open and close the separable contacts 227. The trip circuit 229 is structured to cause the operating mechanism 228 to trip open the separable contacts 227 in response to a trip signal. For example, the trip circuit may include a solenoid or other electrically controlled device that is structured to activate in response to the trip signal and interact with the operating mechanism 228 to cause the operating mechanism 228 to open the separable contacts 227. The lever 222 is structured to interact with the operating mechanism 228 to cause the operating mechanism 228 to open or close the separable contacts 227. For example, actuation of the lever 222 causes the separable contacts 227 to open or close.

The electronic trip unit 221 includes a trip control module 224. The trip control module 224 is structured to monitor for faults based on power flowing through the circuit breaker 220. In response to detecting a fault, the trip control module 224 outputs the trip signal to the trip circuit. To facilitate detecting faults, the one or more sensors 225,226 or inputs 270 may sense characteristics of power flowing through the circuit breaker 220. For example and without limitation, the one or more sensors may include current sensors 226 and a ground fault sensor 225. The one or more input 270 may include inputs 270 structured to sense voltages of power flowing through the circuit breaker 220.

The electronic trip unit 221 also includes a metering module 223. The metering module 223 is structured to meter power flowing through the circuit breaker 223. The metering module 223 may meter any suitable characteristic of power flowing through the circuit breaker 220 (e.g., without limitation, voltage, current, etc.). To facilitate metering of power, the one or more sensors 225,226 may sense characteristics of the power flowing through the circuit breaker 220. For example and without limitation, the one or more sensors 225,226 may include a current sensor and a voltage sensor.

The electronic trip unit 221 further includes a communication interface 292. The communication interface 292 is structured to facilitate wired communication between the circuit breaker 220 and other components of the bus plug 200 such as the motor operator 230 and the wireless communication module 240. In some example embodiments of the disclosed concept, the communication interface 292 ethernet protocol to communicate with other components of the bus plug 200. However, it will be appreciated that the communication interface 292 may use any suitable form of wired communication to communicate with other components of the bus plug 200. In some example embodiments of the disclosed concept, the communication interface 292 is structured to receive receives a control signal from the wireless communication module 240 and responsively output another control signal to the motor operator 230 to control the motor operator 230 to cause the separable contacts 227 to open or close. The communication interface 292 may also communicate information such as metering or status information to the wireless communication module 240 for wireless communication to the external device.

Figure 5:
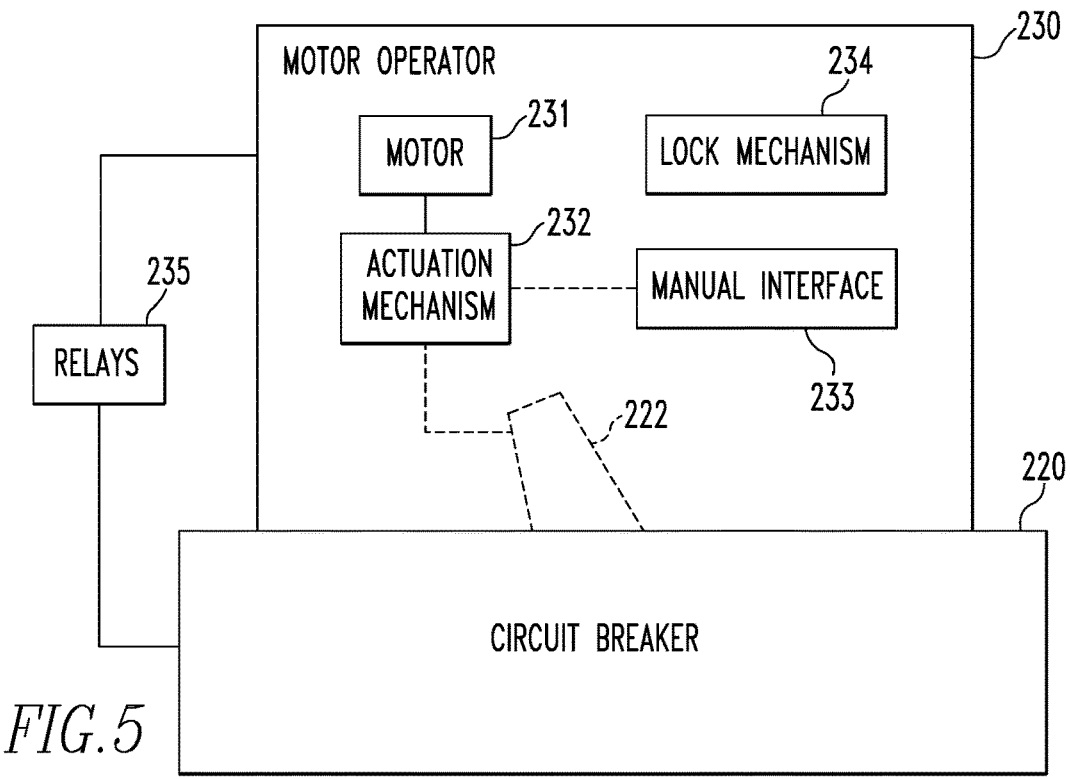
FIG. 5 is a schematic diagram of a motor operator in accordance with an example embodiment of the disclosed concept.

FIG. 5 is a schematic diagram showing the motor operator 230 in more detail in accordance with an example embodiment of the disclosed concept. In some example embodiments of the disclosed concept, the motor operator 230 includes a motor 231, an actuation mechanism 232, a manual interface 233 and a lockout mechanism 234. One or more relays 235 may also be electrically connected between the circuit breaker 220 and the motor operator 230.

The motor operator 230 is structured to cause the circuit breaker 220 to open or close in response to a control signal received from the circuit breaker 220. In some example embodiments of the disclosed concept, the control signal activates one or more relays 235 which, when activated, cause the motor 231 of the motor operator 230 to operate. The motor operator 230 is operatively connected to the actuation mechanism 232. The actuation mechanism 232 is structured to move and physically actuate the lever 222 of the circuit breaker 220 in response to operation of the motor 231. In some example embodiments of the disclosed concept, operation of the motor 231 in one direction causes the actuation mechanism 232 to actuate the lever 222 to open the separable contacts 227 of the circuit breaker 220 and operations of the motor 231 in another direction causes the actuation mechanism 232 to actuate the lever 222 to close the separable contacts 227 of the circuit breaker 220. Driving the motor 231 with different polarities of electricity may cause the motor 231 to operate in different directions. For example, the control signal from the circuit breaker 220 may activate one of the relays 235 to connect the motor 231 to power having one polarity to operate the motor 231 and subsequently cause the separable contacts 227 to open, and the control signal from the circuit breaker 220 may activate another one of the relays 235 to connect the motor 231 to power having another polarity to operate the motor 231 in a different direction and subsequently cause the separable contacts 227 to close. Thus, the control signal from the circuit breaker 220 can be used to cause the motor operator 230 to selectively open or close the circuit breaker 220.

The motor operator 230 further includes the manual interface 233. Operation of the manual interface 233 causes the actuation mechanism 232 to actuate the lever. However, unlike the motor 231 that is powered by electric power, the manual interface 233 is operated by physically interacting with it. A user may physically interact with the manual interface 233 to operate it and cause the lever 222 to be actuated, and thus cause the separable contacts 227 of the circuit breaker 220 to be opened or closed. The manual interface 233 may be structured in any suitable manner to allow physical interaction to operate it and cause the actuation mechanism 232 to actuate the lever 222. In some example embodiments of the disclosed concept, the manual interface 233 may be rotated by a user inserting a key into it and rotating it. The rotation operates the manual interface 233 and causes the actuation mechanism 232 to operate the lever 222.

The motor operator 230 further includes the lockout mechanism 234. The lockout mechanism 234 is used to prevent the motor operator 230 from operating. The lockout mechanism 234 may sometimes be referred to as a lockout/tag out. The lockout mechanism 234 is able to be physically interacted with and moved between a lockout position and a non-lockout position. In the lockout position, the motor operator 230 is unable to operate and will not cause the separable contacts 227 to open or close in response to the control signal from the circuit breaker 220. In the non-lockout position, the motor operator 230 is able to operate and will cause the separable contacts 227 to open or close in response to the control signal from the circuit breaker 220. The lockout mechanism 234 in the lockout position may interact with other components of the motor operator 230 to prevent the motor operator 230 from operating. For example and without limitation, the lockout mechanism may prevent the motor 231 from receiving power or the actuation mechanism 232 from operating while in the lockout position. However, those having ordinary skill in the art will appreciate that other means of preventing operation of the motor operator 230 with the lockout mechanism 234 may be employed without departing from the scope of the disclosed concept. The lockout mechanism 234 is a safety device that is useful for preventing operation of the motor operator 230 when the bus plug 200 is being serviced or otherwise interacted with.

In some example embodiments of the disclosed concept, the bus plug 200 may have an electronic lockout. For example and without limitation, a command to open the circuit breaker 220 may be entered into the external device 300 and wirelessly communicated to the wireless communication module 240. The wireless communication module 240 may communicate the command to the electronic trip unit 221, which in turn controls the motor operator 230 to open the circuit breaker 220. Once the circuit breaker 220 is opened, the motor operator 230 is electronically locked out from closing the circuit breaker 220. That is, the motor operator 230 will not cause the circuit breaker 220 to close until a command to close the circuit breaker 220 is inputted to the external device 300 and wirelessly communicated to the bus plug 200.

Figure 6:
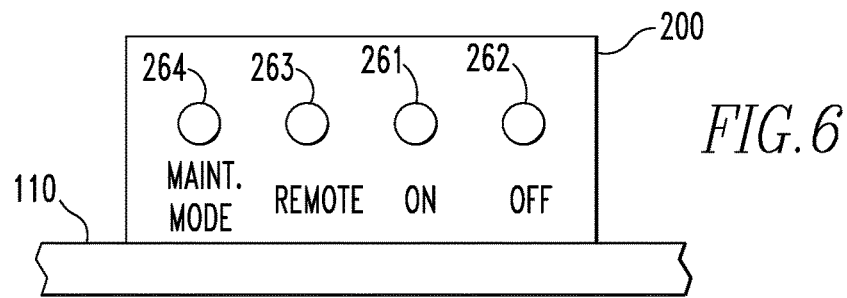
FIG. 6 is a side view of a bus plug in accordance with an example embodiment of the disclosed concept.

FIG. 6 is a side view of the bus plug 200 in accordance with an example embodiment of the disclosed concept. As shown in FIG. 6, the visual indicators 261,262,263,264 are visible from outside the bus plug 200. The first visual indicator 261 may be activated to show that the bus plug 200 is in the on state, the second visual indicator 262 may be activated to show that the bus plug 200 is in the off state, and the third visual indicator 263 may be activated to show that remote operation of the bus plug 200 is available (e.g., without limitation, that the wireless communication module 240 is operating properly) and the fourth visual indicator 264 may be activated to show that the electronic trip unit 221 is in the maintenance mode. The visual indicators 261,262,263,264 may be located on a side of the bus plug 200 that is facing the ground when the bus plug 200 is plugged into the busway 110 (as is shown in FIG. 1). However, it will be appreciated by those having ordinary skill in the art that the visual indicators 261,262,263,264 may be disposed at other locations on the bus plug 200 without departing from the scope of the disclosed concept.

Figure 7:
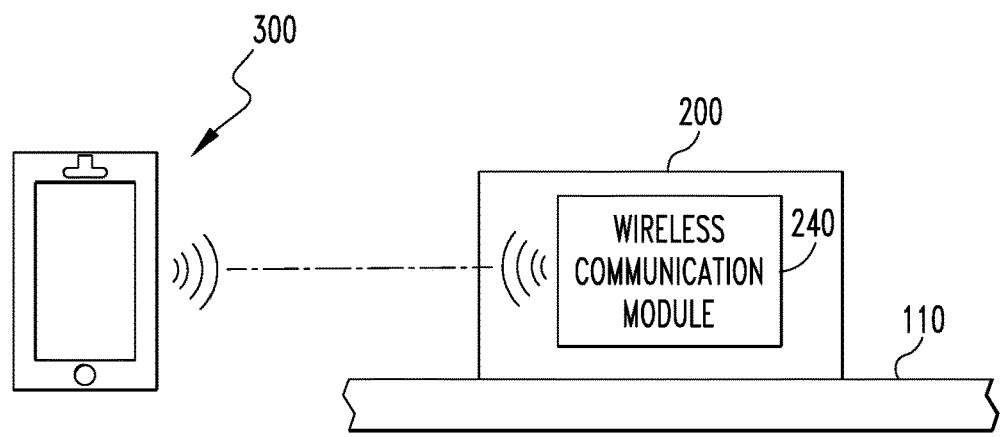
FIG. 7 is a schematic diagram of an external device and a bus plug in accordance with an example embodiment of the disclosed concept.

FIG. 7 is a schematic diagram of the bus plug 200 and the external device 300 in accordance with an example embodiment of the disclosed concept. As shown in FIG. 7, the wireless communication module 240 of the bus plug 200 wirelessly communicates with the external device 300. As has been previously described, command, instructions, and/or information may be exchanged between the wireless communication module 240 and the external device via said communication.

Figure 8:
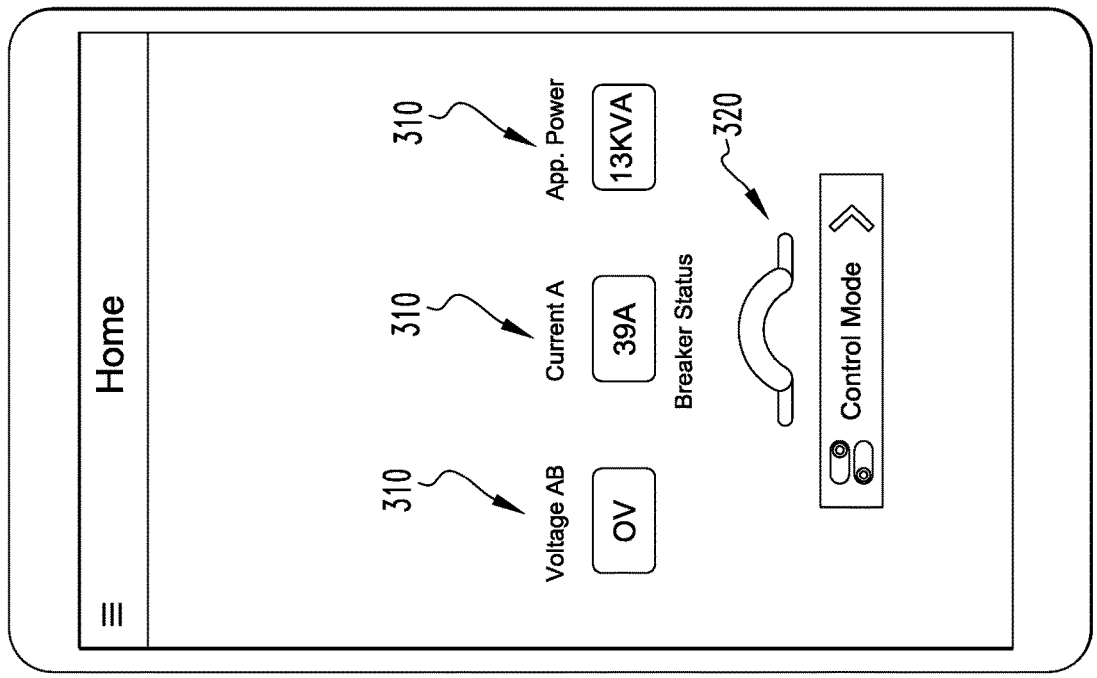

FIG. 8 is a view of the external device 300 in accordance with an example embodiment of the disclosed concept. The external device 300 may display one or more screens that output information. The external device 300 may also receive inputs. In the example shown in FIG. 8 the external device 300 displays information such as metering information 310 of the bus plug 200 and status information 320 of the circuit breaker 220 of the bus plug 200. The metering information 310 may include, for example and without limitation, information on voltage, current, power, or other characteristics of power flowing through the circuit breaker 220. The status information 320 may include information on the status of the circuit breaker 220 (e.g., without limitation, open, closed, tripped).

Figure 9:
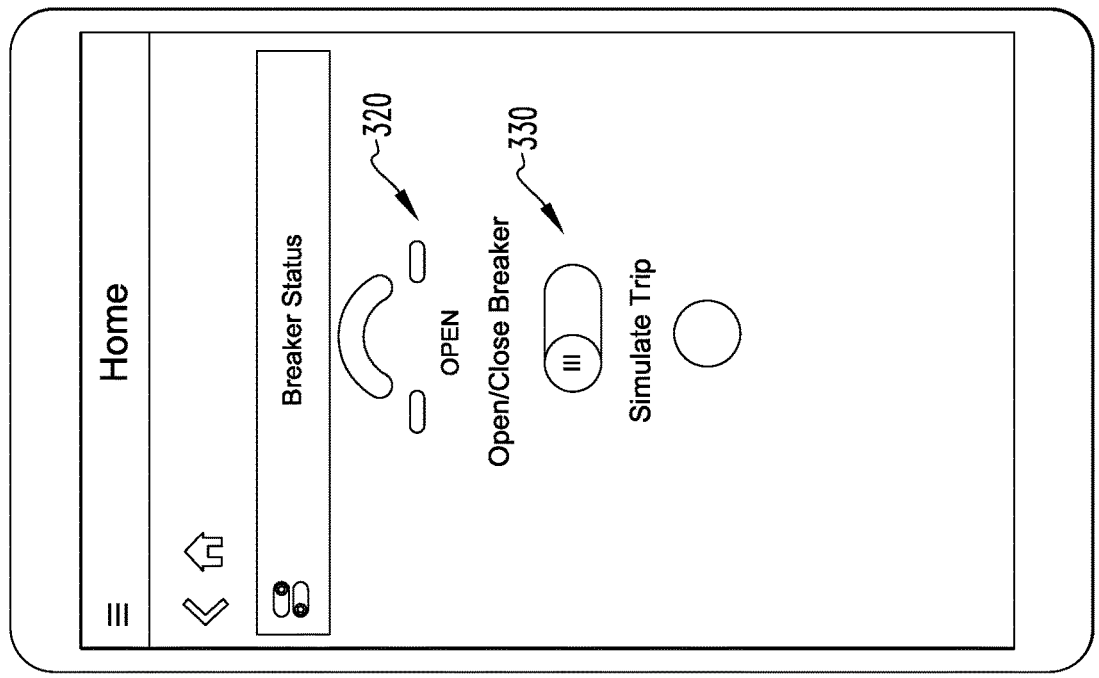
FIGS. 8 and 9 are views of an external device in accordance with an example embodiment of the disclosed concept.

FIG. 9 is a view of the external device 300 in accordance with an example embodiment of the disclosed concept. In FIG. 9, the external device 300 displays a screen that includes status information 320 of the circuit breaker 220 and a control input 330 to enter a command to open or close the circuit breaker 220. Interaction with the control input 330 of the external device 300 causes the circuit breaker 220 to open or close. For example, the external device 300 device wirelessly communicates the command to open or close the circuit breaker 220 in response to a user interacting with the control input 330 to input the command.

While FIGS. 8 and 9 show two example screens displayed on the external device 300, it will be appreciated by those having ordinary skill in the art that the external device 300 may display other screens and information and may receive other types of inputs without departing from the scope of the disclosed concept.

It will be appreciated that the bus plug 200 may include one or more processors. For example and without limitation, the electronic trip unit 221 and/or the wireless communication module 240 may include one or more processors to facilitate operations such as communication, metering, and fault detection and control. Said processors may include an associated memory. The memory may be included in the processors or as a separate component. The processors may be, for example and without limitation, a microprocessor, a microcontroller, or some other suitable processing device or circuitry, that interfaces with the memory or another suitable memory. The memories may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memories may also store one or more routines that the processors are is structured to execute to implement its functions.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A bus plug structured to electrically connect between a busway and a load, the bus plug comprising:
 a circuit breaker structured to electrically connect between the busway and the load, the circuit breaker including separable contacts and an electronic trip unit, the circuit breaker further structured to turn on or off the bus plug via the separable contacts structured to open to stop power from flowing from the busway to the load;
 a wireless communication module structured to wirelessly communicate with an external device and to output a control signal to the electronic trip unit in response to information received from the external device, the information comprising at least a user command or settings information; and
 an indication unit including a number of visual indicators.

2. The bus plug of claim 1, wherein the electronic trip unit is structured to adjust settings of the electronic trip unit based on the settings information.

3. The bus plug of claim 2, wherein the electronic trip unit comprises a maintenance mode comprising maintenance mode settings structured to reduce arc energy.

4. The bus plug of claim 3, wherein the maintenance mode settings comprise reducing or eliminating a specified delay associated with a zone interlock system.

5. The bus plug of claim 3, wherein the maintenance mode provides protection to a user performing maintenance on the bus plug during on-state of the bus plug.

6. The bus plug of claim 3, wherein the information comprises at least the user command, the user command comprises a command to enter the maintenance mode received wirelessly by the wireless communication module from the external device, and the electronic trip unit is further structured to enter the maintenance mode based on the command.

7. The bus plug of claim 3, wherein the visual indicators comprise an indicator structured to indicate that the electronic trip unit is in the maintenance mode.

8. The bus plug of claim 1, wherein the electronic trip unit is structured to meter power flowing through the circuit breaker to obtain metering information and communicate at least one of the metering information and status information of the circuit breaker to the wireless communication module; and wherein the wireless communication module is structured to wirelessly communicate at least one of the metering information and the status information to the external device, and at least one of the metering information and the status information is displayed on the external device and accessed by a user at the external device.

9. The bus plug of claim 8, wherein the user command comprises a command to open or close the circuit breaker received via a control input of the external device based at least in part on the status information displayed on the external device.

10. The bus plug of claim 8, wherein the metering information comprises information on at least one of voltage, current or power flowing through the circuit breaker.

11. The bus plug of claim 7, wherein the status information comprises information on the status of the circuit breaker comprising whether the circuit breaker is open, closed or tripped.

12. The bus plug of claim 1, wherein the visual indicators comprise light emitting diodes.

13. An electrical system comprising:
 a busway;
 an external device; and
 a bus plug electrically coupled between the busway and a load, the bus plug comprising:
  a circuit breaker electrically connected between the busway and the load, the circuit breaker including an electronic trip unit and separable contacts, the circuit breaker further structured to turn on or off the bus plug via the separable contacts structured to open to stop power from the flowing from the busway to the load;
  a wireless communication module structured to wirelessly communicate with the external device and to output a control signal to the electronic trip unit in response to information received from the external device, the information comprising a user command and settings information; and
  an indication unit including a number of visual indicators.

14. The electrical system of claim 13, wherein the electronic trip unit is structured to meter power flowing through the circuit breaker to obtain metering information, and communicate at least one of the metering information or status information of the circuit breaker to the wireless communication module; wherein the wireless communication module is structured to wirelessly communicate the metering information or the status information to the external device, and wherein the metering information or the status information is displayed on the external device and accessed by a user at the external device.

15. The electrical system of claim 13, wherein the electronic trip unit communicates at least the status information, and the user command comprises a command to open or close the circuit breaker received via a control input of the external device based at least in part on the status information displayed on the external device.

16. The electrical system of claim 13, wherein the electronic trip unit includes a maintenance mode comprising maintenance mode settings structured to reduce arc energy, and wherein the user command comprises a command to enter the maintenance mode received wirelessly by the wireless communication module from the external device, and the electronic trip unit is structured to enter the maintenance mode based on the command.

17. The electrical system of claim 13, wherein the visual indicators comprise an indicator structured to indicate that the electronic trip unit is in the maintenance mode.

* * * * *